United States Patent [19]

Colonnello

[11] Patent Number: 4,612,804
[45] Date of Patent: Sep. 23, 1986

[54] APPARATUS FOR MEASURING FUEL CONSUMPTION

[75] Inventor: Rino Colonnello, Soudan, France

[73] Assignee: Aero Product Europa, Soudan, France

[21] Appl. No.: 527,666

[22] Filed: Aug. 30, 1983

[30] Foreign Application Priority Data

Aug. 31, 1982 [FR] France .................. 82 14890

[51] Int. Cl.[4] .................. G01M 15/00
[52] U.S. Cl. .................. 73/113; 73/261
[58] Field of Search .................. 73/113, 261, 861.01; 417/DIG. 1

[56] References Cited

U.S. PATENT DOCUMENTS

| | | | |
|---|---|---|---|
| 1,486,269 | 3/1924 | Schroeder | 73/198 X |
| 2,368,019 | 1/1945 | Guibert et al. | 73/261 X |
| 3,077,840 | 2/1963 | Wood | 417/DIG. 1 |
| 3,267,729 | 8/1966 | Cowburn | 73/861.01 |
| 3,772,915 | 11/1973 | Stamler | 73/113 X |
| 3,973,536 | 8/1976 | Zelders | 123/541 |
| 4,134,301 | 1/1979 | Erwin, Jr. | 73/453 |

FOREIGN PATENT DOCUMENTS 2054039 2/1981 United Kingdom .

OTHER PUBLICATIONS

Englert, O. Ovalradzähler für die Automatisierung. from Olhydraulic and Pneumatic, vol. 11, No. 9, Sep. 1967. pp. 346–357.

*Primary Examiner*—Jerry W. Myracle
*Attorney, Agent, or Firm*—James & Franklin

[57] ABSTRACT

The invention relates to the measurement of the fuel consumption of a combustion engine. It relates to an apparatus which comprises two flowmeters (24, 26) which give temperature-compensated signals because their elliptical rotors 28 have the same coefficient of expansion as their chambers. Temperature sensors 36 permit the flow rates to be corrected before they are subtracted, the operations being carried out by a microcomputer 34. Application to the measurement of the fuel consumption of automobile vehicles.

3 Claims, 2 Drawing Figures

APPARATUS FOR MEASURING FUEL CONSUMPTION

BACKGROUND OF THE INVENTION

The present invention relates to the measurement of the fuel consumption of the engine of a vehicle, whether the latter is moving or stationary. More precisely, it relates to an apparatus for measuring the fuel consumption of a vehicle engine which comprises a feed circuit comprising a pump and placed between a fuel tank and the engine, and an excess fuel return circuit placed between the engine and the tank.

Apparatuses for measuring the fuel consumption of an engine are already known, since this measurement is of undoubted interest to design departments working on combustion engines. It is highly desirable, however, that this consumption should be capable of being followed continuously because it represents the operating conditions of a vehicle. For example, in a heavy truck fleet, the consumptions need to be known for an optimum management of the transportation. However, even in the case of an individual automobile vehicle, knowledge of this consumption is highly desirable.

U.S. Pat. No. 4,134,301 describes an apparatus for measuring the fuel consumption of a combustion engine, comprising two flowmeters having float chambers. Temperature sensors measure the temperature of the fuel at the entry and at the exit and permit compensation of the flow values given by the flowmeters. The apparatus comprises gravity measuring devices and devices intended to purge the vapor bubbles which are formed. Such a laboratory apparatus cannot be employed in a vehicle because of the nature of the flowmeters (float chambers) and the high probability of bubble formation in the event of jerks and vibrations. Moreover, this laboratory apparatus does not yield very reproducible results at low flow rates since these are disturbed by the presence of vapor bubbles, even in a very small quantity. The cost of this apparatus is moreover very high.

SUMMARY OF THE INVENTION

The invention relates to an apparatus permitting the measurement of the fuel consumption of a combustion engine mounted in a vehicle, during the operation of the latter. More precisely, it relates to an apparatus for consumption measurement in a vehicle, which comprises a first flowmeter mounted in the feed circuit equipped with a pump and a second flowmeter mounted in the fuel return circuit. According to the invention, at least one of the flow rates is compensated according to the temperature of the fuel so that the comparison of the two flow rates, after compensation, gives a signal representing the real consumed flow rate with a high accuracy. The compensation can be a real modification of one of the flow rates according to the difference in the feed and the return temperatures of the fuel, or a calculable compensation intended to modify the signals representing the flow.

More precisely, the invention relates to an apparatus for measuring the fuel consumption of a combustion engine mounted in a vehicle, the engine comprising a fuel feed circuit placed between a tank and the engine and comprising a fuel pump, and a circuit for returning the fuel from the engine to the tank, which apparatus comprises:

a first volume flowmeter having a range of measurement comprising low flow rates, mounted in the feed circuit and intended to produce a first flow rate signal, a second volume flowmeter having a range of measurement comprising low flow rates, mounted in the return circuit and intended to produce a second flow rate signal, at least one heat-sensitive compensating device intended to compensate at least one flow rate signal according to the temperature of at least one of the flowmeters, and a combining device intended to receive the two flow rate signals, of which at least one is compensated, and to produce a consumed flow rate signal.

The heat-sensitive compensating device comprises advantageously:

a first temperature sensor associated with the first flowmeter and intended to produce a first signal representing the temperature of the fuel in the first flowmeter, a second temperature sensor associated with the second flowmeter and intended to produce a second signal representing the temperature of the fuel in the second flowmeter, and a device intended to compensate at least the first or the second flow rate signal according to the temperature signals from both sensors, the compensating device thus producing compensated signals of volume flow rate.

The two flowmeters are advantageously of a temperature-compensated type such that, over the whole design range of the fuel temperatures, the same volume flow rate signal represents the same volume of fuel, and the device for compensating the flow rate signals compensates the latter according to the variations in the apparent density of the fuel with the temperature.

The flowmeters are advantageously of a volumetric type with elliptical rotors, comprising a chamber and two elliptical rotors rotating in it, the rotors and the chambers being made of a material having essentially the same coefficient of thermal expansion over the whole design range of the fuel temperatures.

The flowmeters can be of a type which is not temperature-compensated and is such that the same flow rate signal represents a volume which varies with the temperature over the design range of the fuel temperatures, this variation corresponding to a calibration curve of each flowmeter, and the device for compensating the flow rate signals then compensates the latter according, on the one hand, to the calibration curve and, on the other hand, to the variations in the apparent density of the fuel with the temperature.

In one embodiment, the heat-sensitive compensating device comprises a bypass passage (48) formed between the entry and the exit of one of the flowmeters, and a heat-sensitive control valve mounted in the bypass passage and intended to permit flow through the latter at a rate which varies with the temperature.

The compensating device and the combining device are advantageously in the form of a programmed microcomputer.

Advantageously the apparatus also comprises a consumed flow rate indicating device intended to receive the consumed flow rate signal from the combining circuit. This indicating device can be, for example, a visual indicator or a recording device.

BRIEF DESCRIPTION OF THE DRAWING

Other characteristics and advantages of the invention will become more apparent from the following description, given with reference to the attached drawing in which.

DETAILED DESCRIPTION OF THE PREFERRED EMBODIMENT

Figures 1, 2:
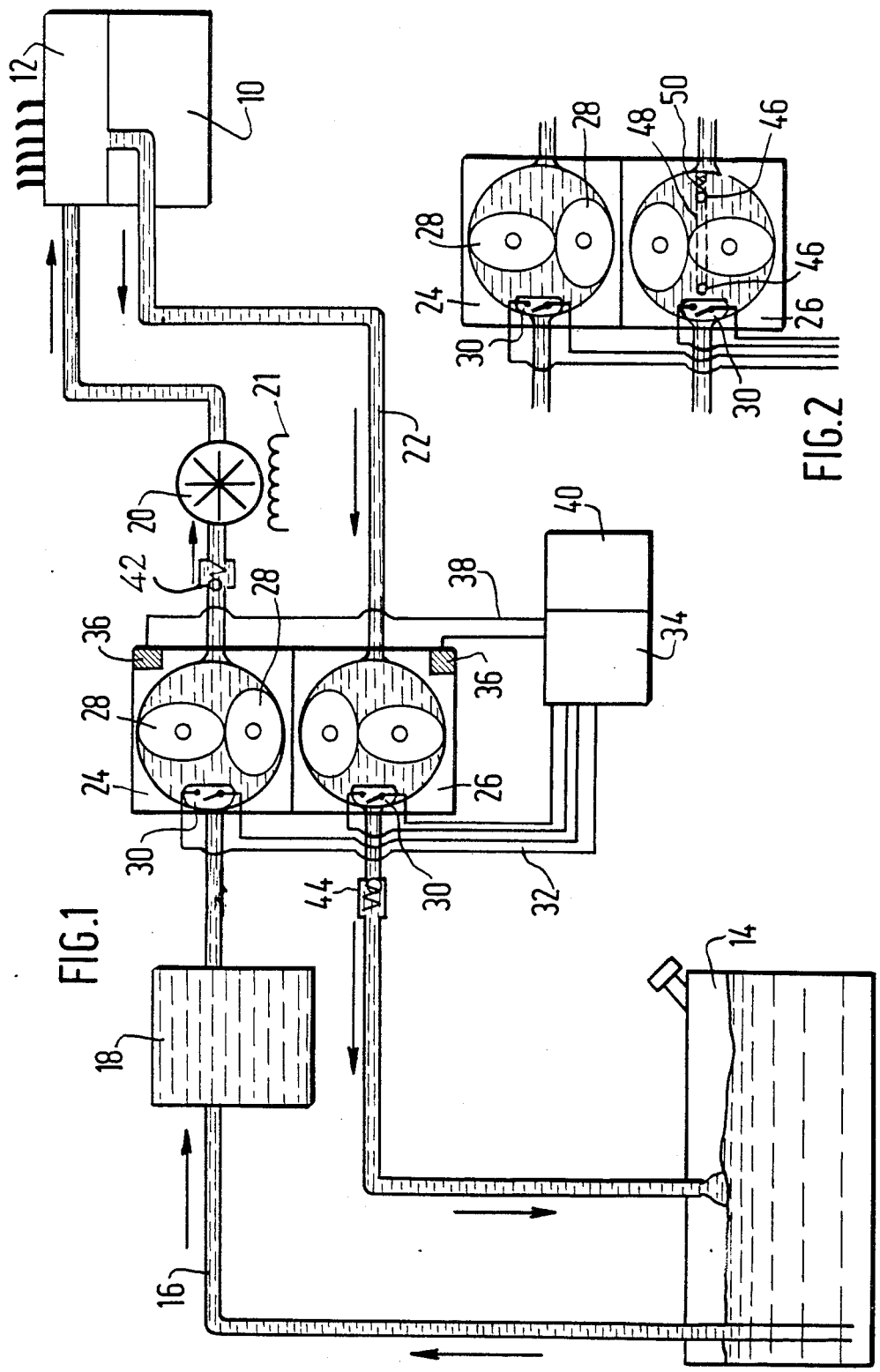
FIG. 1 is a diagram of an apparatus for measuring the consumption of a combustion engine, produced according to the invention.
FIG. 2 is a diagram of a part of an apparatus analogous to that of FIG. 1 but corresponding to a modified embodiment.

In FIG. 1, reference 10 indicates an engine of the injection type which is equipped with injectors 12. These receive fuel from the tank 14 via a feed circuit 16. The latter comprises in succession, starting from the tank 14, a filter 18 and a pump 20. In a known manner, the latter can be equipped with a heating device 21, particularly when the engine 10 is a diesel engine.

A return circuit 22 conveys the excess fuel delivered to the injectors 12 towards the tank 14.

According to the invention, two flowmeters 24, 26 are arranged, one in the feed circuit 16 and the other in the return circuit 22. Each of these flowmeters comprises two elliptical rotors 28 which turn in a leakproof chamber. A coder 30 transmits for example one pulse at each turn of the rotors 28, thus forming a sensor of volume flow rate. The pulses from the coder 30 arrive through a line 32 at a circuit 34, a more detailed description of which follows later in this specification. Each of the two flowmeters 24, 26 is equipped with a temperature sensor 36. The sensor is in contact with the chamber of the flowmeter and, given that this chamber is made of a good heat-conductor, for example a cast aluminum alloy, the signal from each sensor 36 represents the temperature of the fuel circulating in the associated flowmeter. The signals from the sensors 36 also arrive through lines 38 at the aforesaid circuits 34.

According to a very advantageous feature of the invention, the elliptical rotors 28 and the chamber of each flowmeter 24, 26 have the same coefficient of thermal expansion. This feature is very useful because in practice it ensures the temperature compensation of the flowmeter. More precisely, the same value indicated by the flowmeter at different temperatures represents the same volume flow rate. This very advantageous feature does not exist at present in the known flowmeters of this type. For example, when the chamber is made of a cast aluminum alloy the elliptical rotors 28 can be made of an alkyd resin or a polyester reinforced with glass fibers. Naturally, those skilled in the art can easily choose a pair of materials having the same coefficient of thermal expansion to produce such flowmeters. Moreover, the elliptical rotors and the chamber can also be made of the same material if desired.

The circuit 34 thus receives signals representing the volume flow in the feed circuit 16 and in the return circuit 22, together with signals representing the temperatures of the fuel in the two circuits. This circuit 34 is in fact a suitably programmed microcomputer. It therefore acts as a circuit for combining the signals, for compensation and for calculation. More precisely, the circuit 34 compensates the flow rate signal from each flowmeter according to the temperature of the fuel. In fact, the apparent density of the fuel varies considerably with the temperature and one volume flow rate therefore corresponds to different quantities of fuel. Having thus compensated each of the flow rate signals, the circuit 34 subtracts them and thus determines the value of the consumed flow rate. An indicating device 40 can display this value.

According to the invention, it is not essential for the flowmeters 24 and 26 to be of a temperature-compensated type. In a modified embodiment, the flowmeters give a flow rate signal which corresponds to a volume which can vary when the temperature varies. However, this volume variation can be established in advance in the form of a calibration curve. In this case the circuit 34, on receiving the flow rate signal from a coder 30, begins by correcting it according to the calibration curve of the flowmeter. This corrected value then undergoes the compensation depending on the variation in the density with the temperature shown by the associated sensor. In this case the circuit 34 simply carries out an additional operation to correct the information which it receives.

The signal formed by the circuit 34 can be of various types. It can be in terms of an hourly consumption, of an instantaneous consumption or of a consumption related to a reference value, for example a consumption per 100 kilometers. The calculating circuit 34 is provided with all the information required for this purpose and need only be programmed to give the result in any desired form. Naturally, the circuit 34 can also carry out other calculations such as averages, simulated values and the like. Moreover, the circuit 34 can consist of a microcomputer already in existence in a vehicle.

The signal produced by the circuit 34 can be simply displayed or may be recorded. It can also be employed for the automatic control of any mechanism. Naturally, no detailed description is given of such a microcomputer since it incorporates, in a manner which is well known to those skilled in the art, a microprocessor, active and passive memories, input-output circuits and the like.

As shown in FIG. 1, the circuit can comprise, in an advantageous modified embodiment, valves 42 and 44 which are placed at the exit of the feed flowmeter and at the exit of the return flowmeter. These valves maintain the pressure in the circuit. The valve 42 prevents the operation of the flowmeter 24 from being disturbed by possible fluctuations in pump pressure.

FIG. 2 shows another modified embodiment, in the form of a part of the circuit of FIG. 1. In this embodiment the temperature sensors 36 are eliminated and the compensation is ensured by a heat-sensitive device. The latter comprises two orifices 46 opening into the flowmeter 26 on either side of the elliptical rotors. The openings are connected by a bypass passage 48. A heat-sensitive valve 50 permits flow at a higher or lower rate in the bypass passage 48. The flow rate in this passage corresponds to the increase in volume between the temperature of the first flowmeter 24 and that of the second flowmeter 26 (fuel in the return circuit). The compensation of the flow rate signal in this case takes place in a purely mechanical manner.

The above description relates to an apparatus for measuring the fuel consumption of an injection engine. The invention also applies, however, to engines with carburettor feed insofar as the feed circuit is associated with a return circuit. These engines can also be mounted in land vehicles (automobile vehicles), aircraft, or watercraft (fishing ships and boats).

The apparatus produced according to the invention offers many advantages. In the first place, the results obtained are very accurate, the consumption being determined with an accuracy of the order of a part per thousand. The apparatus is very simple since it comprises only two flowmeters associated with the calculating circuit. The whole forms a compact and tamper-proof unit. The simple nature of the flowmeters allows the apparatus to be produced at a low cost, well below that of the flowmeters which are known at present.

I claim:

1. An apparatus for measuring the fuel consumption of a combustible engine mounted in a vehicle, the engine being of the type which comprises a fuel feed circuit placed between a tank and the engine and comprising a fuel pump and a circuit for returning the fuel from the engine to the tank, which apparatus comprises:

a first volume flowmeter having a range of measurement comprising low flow rates, mounted in the fuel feed circuit and intended to produce a first flow rate signal;

a second volume flowmeter having a range of measurement comprising low flow rates, mounted in the return circuit and intended to produce a second flow rate signal;

at least one heat sensitive compensation device intended to compensate at least one flow rate signal, according to the increase of volume of fuel between the temperatures of the flowmeters; and a combining device intended to receive the two flow rate signals of which at least one is compensated, and to produce a consumed flow rate signal, said heat sensitive compensating device comprising:

a first temperature sensor associated with the first flowmeter and intended to produce a first signal representing the temperature of the fuel in the first flowmeter;

a second temperature sensor associated with the second flowmeter and intended to produce a second signal representing the temperature of the fuel in the second flowmeter; and a device intended to compensate at least the first or the second flow rate signal according to the temperature signals from both sensors, the compensating device thus producing compensated signals of volume flow rate compensated according to the variation of apparent density of fuel with the temperature, wherein the two flowmeters are of a temperature compensated type such that, over the whole design range of the fuel temperatures, the same volume flow rate signal represents the same volume of fuel, wherein the flowmeters are of a volumetric type with elliptical rotors, comprising a chamber and two elliptical rotors rotating in it, and the rotors and the chamber are made of materials having essentially the same coefficient of thermal expansion over the whole design range of the fuel temperatures.

2. An apparatus for measuring the fuel consumption of a combustion engine mounted in a vehicle, the engine being of the type which comprises a fuel feed circuit placed between a tank and the engine and comprising a fuel pump and a circuit for returning the fuel from the engine to the tank which apparatus comprises:

a first volume flowmeter having a range of measurement comprising low flow rates, mounted in the fuel feed circuit and intended to produce a first flow rate signal;

a second volume flowmeter having a range of measurement comprising low flow rates, mounted in the return circuit and intended to produce a second flow rate signal, at least one heat-sensitive compensation device intended to compensate at least one flow rate signal, according to the increase of volume of fuel between the temperatures of the flowmeters, and a combining device intended to receive the two flow rate signals of which at least one is compensated, and to produce a consumed flow rate signal, wherein said heat-sensitive compensation device comprises a bypass passage formed between the entry and the exit of one of the flowmeters, and a heat-sensitive control valve mounted in said bypass passage and intended to permit flow through the latter at a rate which varies with the temperature.

3. The apparatus of either of claims 1 or 2, further comprising at least one check valve fitted at least upstream of the first flowmeter, or downstream of the second flowmeter.

* * * * *